(12) United States Patent
Andres et al.

(10) Patent No.: US 8,881,524 B2
(45) Date of Patent: Nov. 11, 2014

(54) DEVICE FOR OPENING A PASSENGER DOOR IN CASE OF EMERGENCY

(75) Inventors: Stefan Andres, Munich (DE); Hans Bartosch, Donauworth (DE); Wolfgang Buchs, Oberndorf (DE); Manfred Held, Aresing (DE); Rainer Hertle, Alerheim (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 1059 days.

(21) Appl. No.: 12/921,520

(22) PCT Filed: Mar. 2, 2009

(86) PCT No.: PCT/IB2009/000392
§ 371 (c)(1),
(2), (4) Date: Feb. 26, 2011

(87) PCT Pub. No.: WO2009/115879
PCT Pub. Date: Sep. 24, 2009

(65) Prior Publication Data
US 2011/0131986 A1    Jun. 9, 2011

(30) Foreign Application Priority Data

Mar. 18, 2008   (DE) .......................... 10 2008 014 691

(51) Int. Cl.
| | | |
|---|---|---|
| F01B 29/08 | (2006.01) | |
| F02N 13/00 | (2006.01) | |
| B64C 1/14 | (2006.01) | |
| F42B 3/04 | (2006.01) | |
| F42B 3/00 | (2006.01) | |
| E05F 15/12 | (2006.01) | |
| E05F 15/04 | (2006.01) | |

(52) U.S. Cl.
CPC ......... B64C 1/1407 (2013.01); E05Y 2201/434 (2013.01); E05Y 2900/531 (2013.01); E05Y 2201/422 (2013.01); E05Y 2800/67 (2013.01); E05F 15/127 (2013.01); F42B 3/04 (2013.01); E05Y 2201/72 (2013.01); E05Y 2800/252 (2013.01); E05F 15/04 (2013.01); E05Y 2900/502 (2013.01); E05F 15/047 (2013.01); F42B 3/006 (2013.01)
USPC ............................................... 60/638; 60/632

(58) Field of Classification Search
USPC .................................. 60/632–638; 244/129.5
See application file for complete search history.

(56) References Cited

U.S. PATENT DOCUMENTS

| | | | | |
|---|---|---|---|---|
| 4,144,714 A | * | 3/1979 | Bendler | 60/632 |
| 4,230,288 A | * | 10/1980 | Fohl | 242/374 |
| 4,381,084 A | * | 4/1983 | Fohl | 242/374 |
| 5,251,851 A | | 10/1993 | Herrmann et al. | |
| 7,114,431 B1 | | 10/2006 | Holder | |

FOREIGN PATENT DOCUMENTS

| | | | |
|---|---|---|---|
| DE | 4124377 C1 | | 12/1992 |
| DE | 4408194 A1 | | 9/1995 |
| EP | 1418121 A1 | * | 5/2004 |
| EP | 1882617 A2 | | 1/2008 |
| FR | 2880659 A1 | | 7/2006 |
| WO | 2006081664 A1 | | 8/2006 |

OTHER PUBLICATIONS

International Search Report and Written Opinion; Application No. PCT/IB2009/000392; dated Jun. 11, 2009.
Extended European Search Report Dated Mar. 15, 2011, Application No. 1100043.7-1254/2305560, Applicant Eurocopter Deutschland GmbH, 3 Pages.

* cited by examiner

*Primary Examiner* — Christopher Jetton
(74) *Attorney, Agent, or Firm* — Brooks Kushman P.C.

(57) ABSTRACT

The invention relates to a device for opening a passenger door (1) of an aircraft in case of emergency, which is fastened so it is manually pivotable on the fuselage (3) of the aircraft via a hinge and/or support arm configuration (2), an auxiliary-energy-operated emergency opening drive (4) being provided between the fuselage (3) and the passenger door (1), which automatically opens the passenger door (1) in accordance with an emergency control unit (5), the auxiliary energy for the emergency opening drive (4) being pyrotechnic energy, whose gas expanding inside an expansion chamber (6) after triggering by the emergency control unit (5) impinges the emergency opening drive (4) with pressure medium to open the passenger door (1), wherein said emergency opening drive (4) generates a rotational movement.

18 Claims, 2 Drawing Sheets

DEVICE FOR OPENING A PASSENGER DOOR IN CASE OF EMERGENCY

FIELD OF THE INVENTION

The present invention relates to a device for opening a passenger door of an aircraft, which is fastened so it is manually pivotable on the fuselage of the aircraft via a hinge and/or support arm configuration, in case of emergency, an auxiliary-energy-operated emergency opening drive acting between the fuselage and the passenger door being provided, which automatically opens the passenger door in accordance with an emergency control unit.

The field of use of the present invention extends to aircraft, in particular passenger airplanes. For reasons of safety, passenger doors and also emergency exit doors of such an aircraft must be able to be opened with very high reliability and rapidly in the event of an emergency landing, for example, so that the passengers may rapidly leave the aircraft. For this purpose, devices according to the object of the invention for opening a passenger door are employed, which allow an automatic opening of the passenger door in accordance with an emergency control unit.

BACKGROUND OF THE INVENTION

A device according to the species is disclosed in DE 102 12 188 A1. It comprises an emergency opening drive for pivoting a passenger door, which is mounted on a support arm, which is mounted so it is pivotable in an axis on the fuselage-side frame. In case of emergency, the emergency opening drive is switched on, which causes the passenger door to pivot open into the opening position. The emergency opening drive may operate according to a pneumatic, hydraulic, electrical, or mechanical action principle. In the context of a pneumatic action principle, an emergency opening cylinder belonging to the emergency opening drive is connected to a gas cartridge. Upon release of the gas by an emergency control unit, it is conducted into the emergency opening cylinder, so that the piston therein moves a pushrod, which is fastened at its end on the support arm to execute the desired pivoting movement to open the passenger door. The gas cartridge represents a pneumatic pressure accumulator, which provides the drive power for the emergency opening cylinder, implemented as a linear drive.

The high maintenance effort connected thereto has proven to be disadvantageous for this technical solution. This is because gas cartridges are to be checked frequently and replaced in the event of pressure loss. For reasons of safety, fixed monitoring intervals are prescribed. If the emergency opening drive is based on an electrical action principle, reliable provision of a sufficient level of electrical power is always to be ensured in case of emergency. Because the system must thus operate independently of the onboard electrical network, an electrical power accumulator is typically necessary, which increases the device outlay.

Another device is disclosed in EP 1 418 121 A1, in which a type of singly-acting pneumatic cylinder of a typical construction is used for the emergency opening, whose floor-side pressure chamber is coupled directly to a pyrotechnic propellant charge. In practice, the use of this solution may result in uncontrolled violent pivoting open of the passenger door.

SUMMARY OF THE INVENTION

It is therefore the object of the present invention to provide a device for opening a passenger door of an aircraft in case of emergency which ensures a reliable emergency opening of the passenger door using simple technical means.

The object is achieved proceeding from a device according to the preamble of claim 1 in connection with its characterizing features. The following dependent claims describe advantageous refinements of the invention.

The invention includes the technical teaching that the auxiliary energy for the emergency opening drive is pyrotechnic energy, whose gas, which expands inside a protected expansion chamber after triggering by the emergency control unit, impinges the emergency opening drive as adapted pressure means to open the passenger door.

The advantage of the solution according to the invention is, in particular, that the auxiliary energy for the emergency opening drive may be provided over a long period of time reliably with little outlay and occupying little installation space. This is because an explosive substance may preferably used to generate the pyrotechnic energy, which is capable of generating sufficient auxiliary energy for the emergency opening drive after triggering or ignition. Complex maintenance measures are thus dispensed with in comparison to the solutions based on the pneumatic action principle discussed above. Heavy and complex batteries for the electrical power storage and/or buffering for the purpose of decoupling from the onboard electrical network in regard to the electrical active principle are dispensed with. In addition, the expansion chamber employed according to the invention ensures a controllable unfolding of pressure on the emergency opening drive.

According to a first embodiment of the invention, a direct impingement of the emergency opening drive with the auxiliary energy occurs in that a housing shaped like an annular segment, which is adapted to the opening movement of the passenger door, having at least one internal blade is used as a movable drive element. In case of two blades, it is suggested that they be situated opposing in pairs to achieve a high efficiency. The housing, which is shaped like an annular segment or is curved, generates—contrary to typical piston-cylinder units—an adapted pivot movement for directly opening the passenger door. Interposed gears or transmission means are thus superfluous.

According to a second embodiment of the invention, it is also conceivable to use a linear cylinder in an emergency opening drive.

In this case, it is suggested that the internal piston drive at least one sliding pin, which is used in helical groove means to reshape the linear movement into a rotational movement for the opening of the passenger door. The advantage of this embodiment is that the cylinder itself may be produced easily because of the linear shape and prefinished recirculating ball spindles or the like may be used in regard to the helical groove means.

According to a preferred variant, a sliding pin driven by the piston may have its ends extending through assigned linear axially-parallel guide slots in the cylinder and work together with a threaded sleeve, which encloses the cylinder and is co-axially rotatable thereto and is mounted so it is rotatable thereon, as the helical grooved means, in such a way that the threaded sleeve generates the rotational movement.

Alternatively thereto, it is also more simply possible that the helical groove means are executed as a helical groove guide directly on the inner wall of the cylinder. A typical recirculating ball spindle or the like is thus superfluous.

If the impingement of the emergency opening drive is performed indirectly, it is suggested according to a third embodiment that a turbine be used to generate the rotational movement from the pyrotechnic energy, which works together with a downstream reduction gear to open the passenger door. Because the pyrotechnically generated gas expands very rapidly, the energy thus suddenly released may be efficiently converted into a mechanical rotational movement by a rapidly rotating turbine. However, because a comparatively slower rotational velocity is necessary for pivoting open the passenger door, the reduction gear downstream from the turbine is used. In the simplest case, it may be implemented as a spur gear or—in a space-saving variant—as a planetary gear, the drive occurring via the sun wheel and the gear ring forming the output.

In the third embodiment described above, the turbine having the reduction gear may preferably be housed on-board in the area of the door-side pivot axis of a door support arm. This is because the reduction gear may be easily coupled to the door opening mechanism at this point.

To also employ the reduction gear provided for emergency opening and coupled to the turbine in another way, it may also be used as the reduction gear for the normal opening. In this case, the reduction gear is also coupled at its input to an electro-motorized rotational actuator. The rotational actuator is typically manually activated to actuate the passenger door during the normal entry and exit procedure. A further gear for this purpose may thus be saved.

The emergency control unit preferably performs an activation of the pyrotechnic energy via mechanism, electro-explosive igniter, or laser pulse. The power supply for actuating the igniter is preferably to be generated by magnetic impact generator or piezoelectric generator, and thus independently of the normal onboard electrical network. A breakdown of the onboard electrical network in case of emergency thus does not endanger the operation of the emergency opening of the passenger door.

According to another measure which improves the invention, it is suggested that the working pressure contained in the pyrotechnic energy be reduced by throttle means interpolated into the flow path after the expansion chamber. Through this measure, influence may be taken on the pressure pulse curve of the pyrotechnic energy and its peaks may be controlled by simple technical means, such as a throttle screen. This measure increases the operational reliability of the device according to the object of the invention.

BRIEF DESCRIPTION OF THE DRAWINGS

Further measures which improve the invention are explained in greater detail hereafter together with the description of three preferred embodiments of the invention on the basis of the drawing. In the figures.

DETAILED DESCRIPTION OF THE PREFERRED EMBODIMENT

Figure 1:
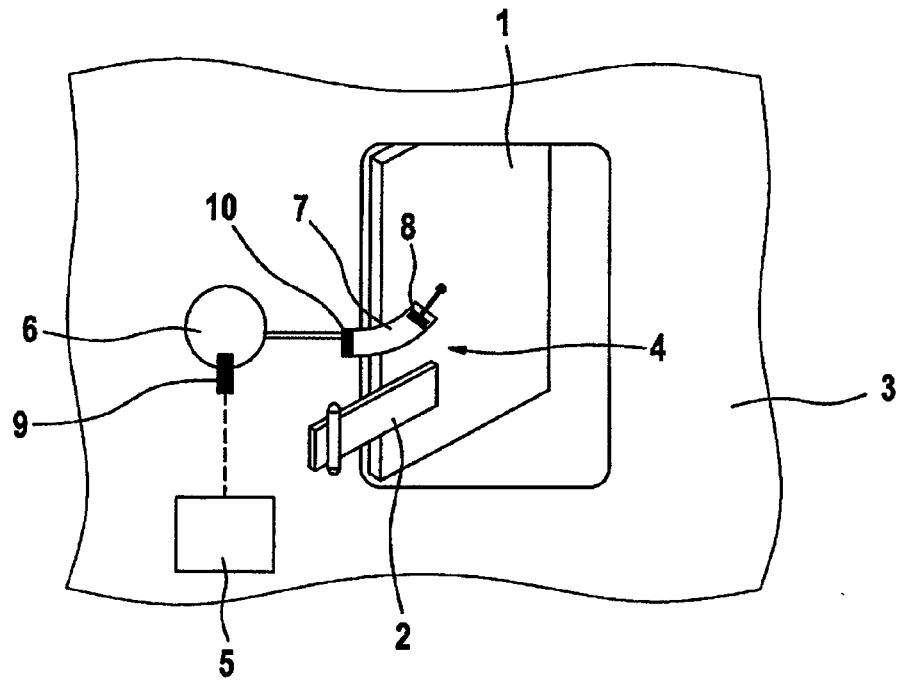
FIG. 1 shows a device for opening a passenger door using direct impingement of an emergency opening drive according to a first embodiment.

According to FIG. 1, a passenger door 1 of an aircraft is fastened to a fuselage 3 of the aircraft via a support arm configuration 2 so it is pivotable. The support arm 2 carries the entire load of the passenger door 1 and is situated so it is pivotable in relation to the fuselage 3 via hinge means, so that the passenger door 1 may be open and closed manually.

Furthermore, seal and closing means (not shown in greater detail) are provided between the fuselage 3 and the passenger door 1, to keep the passenger door 1 closed securely and pressure-tight during the flight.

In case of emergency, the passenger door 1 may also be opened in way other than that described above.

For this purpose, an auxiliary-energy-operated emergency opening drive 4 is provided between the fuselage 3 and the passenger door 1. The emergency opening drive 4, which is implemented in this embodiment as a curved housing 7, is impinged by pressure medium in that an explosive substance, which is housed in a protected expansion chamber 6, is electrically ignited by an emergency control unit 5. The pyrotechnic energy released in this way then directly reaches a blade 8 housed in a housing 7, which travels along an opening angle described by the curved housing 7, to open the passenger door 1.

The ignition of the explosive substance inside the expansion chamber 6 is performed here via electro-explosive igniter 9, which is inserted so it is replaceable in the wall of the expansion chamber 6. The electro-explosive igniter 9 is electrically actuated by the emergency control unit 5, which contains a piezoelectric generator for this purpose, to decouple the power supply for activating the igniter 9 from the onboard electrical network.

To control the pulsed pyrotechnic energy generated in the expansion chamber 6, throttle means 10 in the form of a screen are additionally interposed between the expansion chamber 6 and the housing 7, which ensure a more easily controllable pressure impingement of the housing 7.

Figure 2:
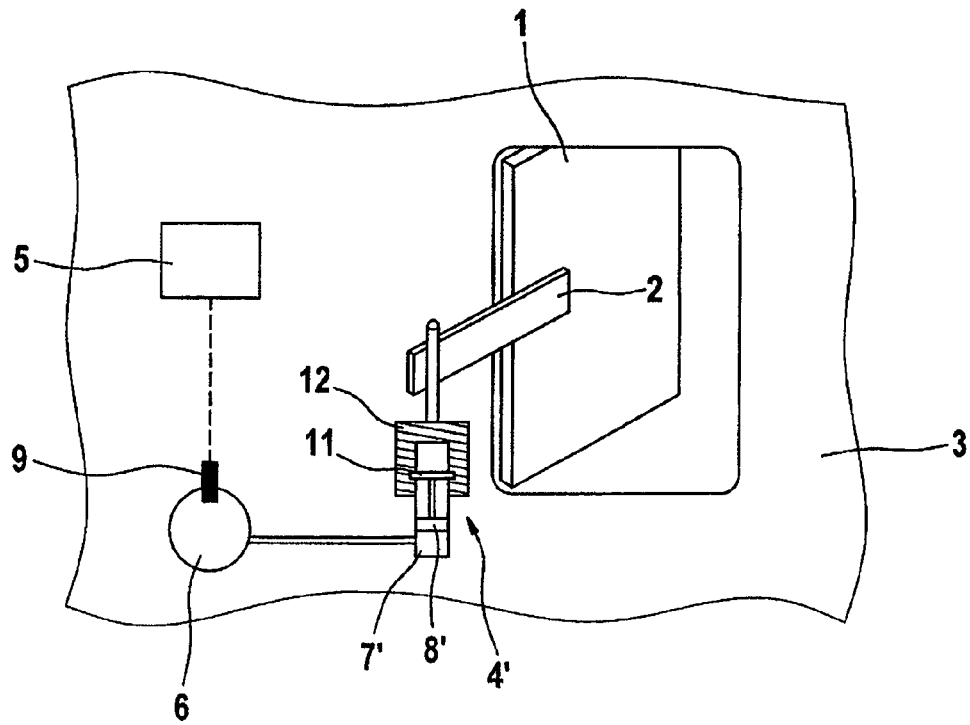
FIG. 2 shows a device for opening a passenger door using direct impingement of an emergency opening drive according to a second embodiment.

According to FIG. 2, the emergency opening drive 4' comprises a cylinder 7', which is linear in contrast to the embodiment described above, having internal piston 8', which is thus movable linearly. This piston-cylinder unit drives a sliding pin 11, which is engaged in helical grooved means for reshaping the linear movement of the piston-cylinder unit into a relatively slower rotational movement for the opening of the passenger door 1. A threaded sleeve having a high thread pitch forms the helical grooved means here, which is implemented as a recirculating ball spindle 12 and encloses the cylinder 7', so that the linear movement of the sliding pin 11 of the piston 8' along an assigned axially-parallel grooved guide in the cylinder 7' is converted into the rotational movement for opening the passenger door 1, which acts directly on the door-side pivot axis of the support arm configuration 2 here.

Figure 3:
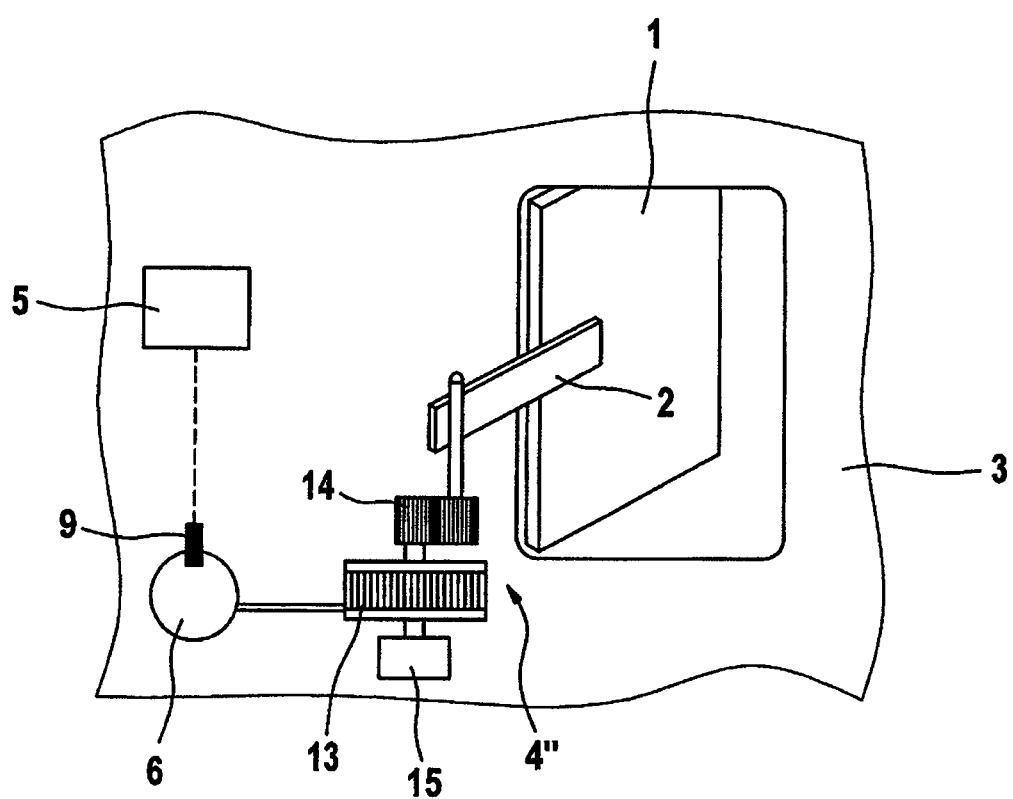
FIG. 3 shows a device for opening a passenger door using direct impingement of an emergency opening drive according to a third embodiment.

In the embodiment illustrated in FIG. 3, which operates according to the principle of an indirect impingement of an emergency opening drive 4'' with auxiliary energy, in contrast to the two embodiments described above, the emergency opening drive 4'' comprises a turbine 13 which generates a rapid rotational movement at high efficiency starting from the pyrotechnic energy from the expansion chamber 6. Because a rapid rotational movement of this type is not directly usable for the comparatively relatively slow opening of the passenger door 1, a reduction gear 14 is interposed. The reduction gear 14 is housed in the area of the door-side pivot axis of the support arm configuration 2 here.

The reduction gear 14 serves, in addition to reducing the output-side speed of the turbine 13, as an electro-motorized rotational actuator 15 for reducing the rapid rotational movement generated by these drive means. The electro-motorized rotational actuator 15 is provided for opening the passenger door 1 in the normal case and is thus used as an aid to the movement of a heavy passenger door 1.

The invention is not restricted to the preferred embodiments described above. Rather, alterations thereof are also conceivable, which are included by the protective scope of the following claims. Thus, for example, it is also possible to differently implement the helical grooved means for reshaping the linear movement of the piston-cylinder unit, which is impinged by the pyrotechnic energy, into a rotational movement for pivoting the passenger door. In this regard, it would be conceivable that the sliding pin of the piston engages directly in a helical grooved guide on the inner wall of the cylinder.

Furthermore, the possible use of the present invention is not solely restricted to passenger doors. Rather, other doors and hatches of an aircraft may also be equipped with the device described here for opening in case of emergency. In addition to a configuration described above of the indirectly impinged emergency opening drive on the fuselage-side axis of the support arm, it is also possible to situate the emergency opening drive on the door-side axis of the support arm.

LIST OF REFERENCE NUMERALS 1 passenger door
2 support arm configuration
3 fuselage
4 emergency opening drive
5 emergency control unit
6 expansion chamber
7 housing/cylinder
8 blade/piston
9 igniter
10 throttle means
11 sliding pin
12 recirculating ball spindle
13 turbine
14 reduction gear
15 rotational actuator

The invention claimed is:

1. A device for opening a passenger door of an aircraft in case of emergency, which is fastened so it is manually pivotable on the fuselage of the aircraft via a hinge and/or support arm configuration, the device comprising:
   an auxiliary-energy-operated emergency opening drive acting between the fuselage and the passenger door, including a pyrotechnic energy source, a protected expansion chamber for expanding gas within, a turbine for generating rotational movement from the pyrotechnic energy, and a downstream reduction gear, and
   an emergency control unit triggering the expanding gas,
   wherein the emergency opening drive automatically opens the passenger door in accordance with the emergency control unit,
   wherein the gas expanding within the protected expansion chamber after triggering by the emergency control unit impinges the emergency opening drive as a pressure medium to open the passenger door, the turbine and reduction gear cooperating to open the passenger door.

2. The device according to claim 1, wherein the turbine is housed with the reduction gear in the area of the door-side pivot axis of the support arm configuration.

3. The device according to claim 1, wherein the reduction gear of the turbine also serves as the reduction gear of the electro-motorized rotational actuator which executes the normal opening.

4. The device according to claim 1, wherein the emergency control unit performs an activation of the pyrotechnic energy via a mechanism, via electro-explosive igniter, or via laser pulse.

5. The device according to claim 4, wherein the power supply for actuating the igniter is performed by a magnetic impact generator or a piezoelectric generator.

6. The device according to claim 1, wherein the working pressure containing the pyrotechnic energy is controllable by throttle means interposed in the flow path after the expansion chamber.

7. An aircraft comprising:
   a fuselage;
   an aircraft door pivotably connected to the fuselage; and
   an emergency opening drive including an expansion chamber, a pyrotechnic energy source associated with the expansion chamber, a turbine in fluid communication with the expansion chamber, a reduction gear mechanically coupling the turbine and the aircraft door and configured to open the aircraft door in response to rotational movement from the turbine, and a controller configured to activate the pyrotechnic energy source.

8. The aircraft of claim 7, further comprising an ignition device connected to and configured to ignite the pyrotechnic energy source, the controller being configured to activate the ignition device by a magnetic impact generator or a piezoelectric generator.

9. The aircraft of claim 7, wherein the controller is configured to activate the pyrotechnic energy source via a laser pulse.

10. The aircraft of claim 7, wherein the turbine and reduction gear are housed within the fuselage proximate a pivot axis of the aircraft door.

11. The aircraft of claim 7, further comprising an electromotor actuator coupled to the reduction gear and configured to, in response to a manual input, actuate the reduction gear to open the aircraft door.

12. The aircraft of claim 7, wherein the reduction gear includes a spur gear or a planetary gear set.

13. An emergency opening device for opening an aircraft door, the device comprising:
   an expansion chamber;
   a pyrotechnic energy source associated with the expansion chamber;
   a controller configured to ignite the pyrotechnic energy source;
   a turbine in fluid communication with the expansion chamber; and
   a gearing assembly connecting the turbine with an aircraft door and configured to open the door in response to rotational movement from the turbine.

14. The emergency opening device of claim 13, wherein the gearing assembly includes a spur gear or a planetary gear set.

15. The emergency opening device of claim 13, further comprising an ignition device connected with and configured to ignite the pyrotechnic energy source, the controller being configured to activate the ignition device by a magnetic impact generator or a piezoelectric generator.

16. The emergency opening device of claim 13, wherein the controller is configured to ignite the pyrotechnic energy source via a laser pulse.

17. The emergency opening device of claim 13, wherein the turbine and reduction gear are housed within an aircraft fuselage proximate a pivot axis of an aircraft door.

18. The emergency opening device of claim 13, wherein the pyrotechnic energy source is retained within the expansion chamber.

* * * * *